US010700938B2

(12) United States Patent
Chhibber et al.

(10) Patent No.: US 10,700,938 B2
(45) Date of Patent: Jun. 30, 2020

(54) EFFICIENT CONFIGURATION OF MULTICAST FLOWS

(71) Applicant: Cisco Technology, Inc., San Jose, CA (US)

(72) Inventors: Rishi Chhibber, Dublin, CA (US); Roshan Lal, San Jose, CA (US); Padmanab Pathikonda, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 16/050,049

(22) Filed: Jul. 31, 2018

(65) Prior Publication Data
US 2020/0044929 A1   Feb. 6, 2020

(51) Int. Cl.
H04L 12/26 (2006.01)
H04L 12/24 (2006.01)
G06F 9/54 (2006.01)
H04L 12/751 (2013.01)
H04L 12/18 (2006.01)

(52) U.S. Cl.
CPC .......... H04L 41/0896 (2013.01); G06F 9/547 (2013.01); H04L 12/18 (2013.01); H04L 45/026 (2013.01)

(58) Field of Classification Search
CPC .................................................. H04L 41/0896
See application file for complete search history.

(56) References Cited

U.S. PATENT DOCUMENTS

2012/0163373 A1* 6/2012 Lo ........................... H04L 12/18
                                                            370/354
2019/0036717 A1* 1/2019 Kebler ................ H04L 12/1877

OTHER PUBLICATIONS

"AMWA IS-06 NMOS Network Control API Specification: Network links", https://github.com/AMWA-TV/nmos-network-control/blob/master/docs/5.0.%20Network%20Links.md, (c) AMWA 2017, CC Attribution-ShareAlike 4.0 International (CC BY-SA 4.0), downloaded from the internet on Jul. 20, 2018, 2 pages.
"AMWA NMOS Network Control API Specification: Network Device", https://github.com/AMWA-TV/nmos-network-control/blob/master/docs/4.0.%20Network%20Device.md, (c) AMWA 2017, CC Attribution-ShareAlike 4.0 International (CC BY-SA 4.0), downloaded from the internet on Jul. 20, 2018, 1 pages.
(Continued)

*Primary Examiner* — Melvin C Mercelo
(74) *Attorney, Agent, or Firm* — Edell, Shapiro & Finnan, LLC (57) ABSTRACT

In one example embodiment, a network node of a plurality of network nodes in a multicast path is configured to provide a multicast flow from a source of the multicast flow to a receiver of the multicast flow. The network node obtains, from the receiver in a reverse direction of the multicast path, configuration instructions specifying a configuration of the multicast flow. The network node implements the configuration of the multicast flow in accordance with the configuration instructions, and provides the configuration instructions toward the source in the reverse direction of the multicast path.

20 Claims, 6 Drawing Sheets

(56) References Cited

OTHER PUBLICATIONS

"AMWA IS-06 NMOS Network Control API Specification: Network Flow", https://github.com/AMWA-TV/nmos-network-control/blob/master/docs/3.0.%20Network%20Flow.md, (c) AMWA 2017, CC Attribution-ShareAlike 4.0 International (CC BY-SA 4.0), downloaded from the internet on Jul. 20, 2018, 2 pages.

"AMWA IS-06 NMOS Network Control API Specification: Endpoint", https://github.com/AMWA-TV/nmos-network-control/blob/master/docs/2.0.%20Endpoint.md, downloaded from the internet on Jul. 20, 2018, 2 pages.

"AMWA IS-06 NMOS Network Control API Specification: Overview", https://github.com/AMWA-TV/nmos-network-control/blob/master/docs/1.0.%20Overview.md, downloaded from the internet on Jul. 20, 2018, 3 pages.

"Protocol Independent Multicast (PIM) Parameters", https://www.iana.org/assignments/pim-parameters/pim-parameters.xhtml, downloaded from the internet on Jul. 10, 2018, 5 pages.

"Cisco Nexus 9000 Series NX-OS Programmability Guide, Release 7.x", https://www.cisco.com/c/en/us/td/docs/switches/datacenter/nexus9000/sw/7-x/programmability/guide/b_Cisco_Nexus_9000_Series_NX-OS_Programmability_Guide_7x/b_Cisco_Nexus_9000_Series_NX-OS_Pro, downloaded from the internet on Jul. 10, 2018, 11 pages.

"Transport of Uncompressed Elementary Stream Media over IP", Video Services Forum (VSF) Technical Recommendation TR-03, Nov. 12, 2015, VSF_TR-03_2015-11-12, VSF TR-3 Version 1.0, 22 pages.

"IP Multicast Technology Overview", https://www.cisco.com/c/en/us/td/docs/ios/solutions_docs/ip_multicast/White_papers/mcst_ovr.html, Apr. 18, 2002, 24 pages.

S. Venaas, et al., "Hierarchical Join/Prune Attributes", Internet Engineering Task Force (IETF), ISSN: 2070-1721, RFC 7887, Jun. 2016, 8 pages.

A. Boers, et al., "The Protocol Independent Multicast (PIM) Join Attribute Format", Network Working Group, RFC 5384, Nov. 2008, 10 pages.

B. Cain, et al., "Internet Group Management Protocol, Version 3", Network Working Group, RFC 3376, Oct. 2002, 53 pages.

Hewlett Packard Enterprise Development LP, "Aruba 2530 Multicast and Routing Guide for ArubaOS-Switch 16.05", Dec. 2017, 79 pages.

Racherla, Sangam et al., "IP Multicast Protocol Configuration", International Technical Support Organization, Apr. 2012, 64 pages.

Alcatel-Lucent, "Multicast", Alcatel-Lucent 7950, Extensible Routing System, Release 13.0.R4, Routing Protocols Guide, pp. 23-60, created Aug. 10, 2012, modified Aug. 8, 2015.

Arista, "Chapter 40: Protocol Independent Multicast", 62 pages, created Jun. 30, 2002, modified Nov. 24, 2019.

Juniper Networks, Inc., "Understanding Bandwidth Management for Multicast", https://www.juniper.net/documentation/en_US/junos/topics/concept/multicast-bandwidth-management-overview.html, Aug. 30, 2017, 1 page.

Juniper Networks, Inc., "Understanding IGMP", https://www.juniper.net/documentation/en_US/junos/topicsi/concept/multicast-igmp-overview.html, Aug. 30, 2017, 3 pages.

\* cited by examiner

EFFICIENT CONFIGURATION OF MULTICAST FLOWS

TECHNICAL FIELD

The present disclosure relates to multicast technology.

BACKGROUND

Traditional Internet Protocol (IP) multicast is a bandwidth-conserving technology that reduces network traffic by simultaneously delivering a single stream of information to potentially thousands of recipients. Applications of multicast technology include video conferencing, corporate communications, distance learning, distribution of software, stock quotes, and news. Multicast packets are replicated in a multicast fabric at the point where paths diverge by network nodes enabled with protocols that support multicast (e.g., Protocol Independent Multicast (PIM)), resulting in the efficient delivery of data to multiple receivers.

DESCRIPTION OF EXAMPLE EMBODIMENTS

Overview

In one example embodiment, a network node of a plurality of network nodes in a multicast path is configured to provide a multicast flow from a source of the multicast flow to a receiver of the multicast flow. The network node obtains, from the receiver in a reverse direction of the multicast path, configuration instructions specifying a configuration of the multicast flow. The network node implements the configuration of the multicast flow in accordance with the configuration instructions, and provides the configuration instructions toward the source in the reverse direction of the multicast path.

Example Embodiments

Figure 1:
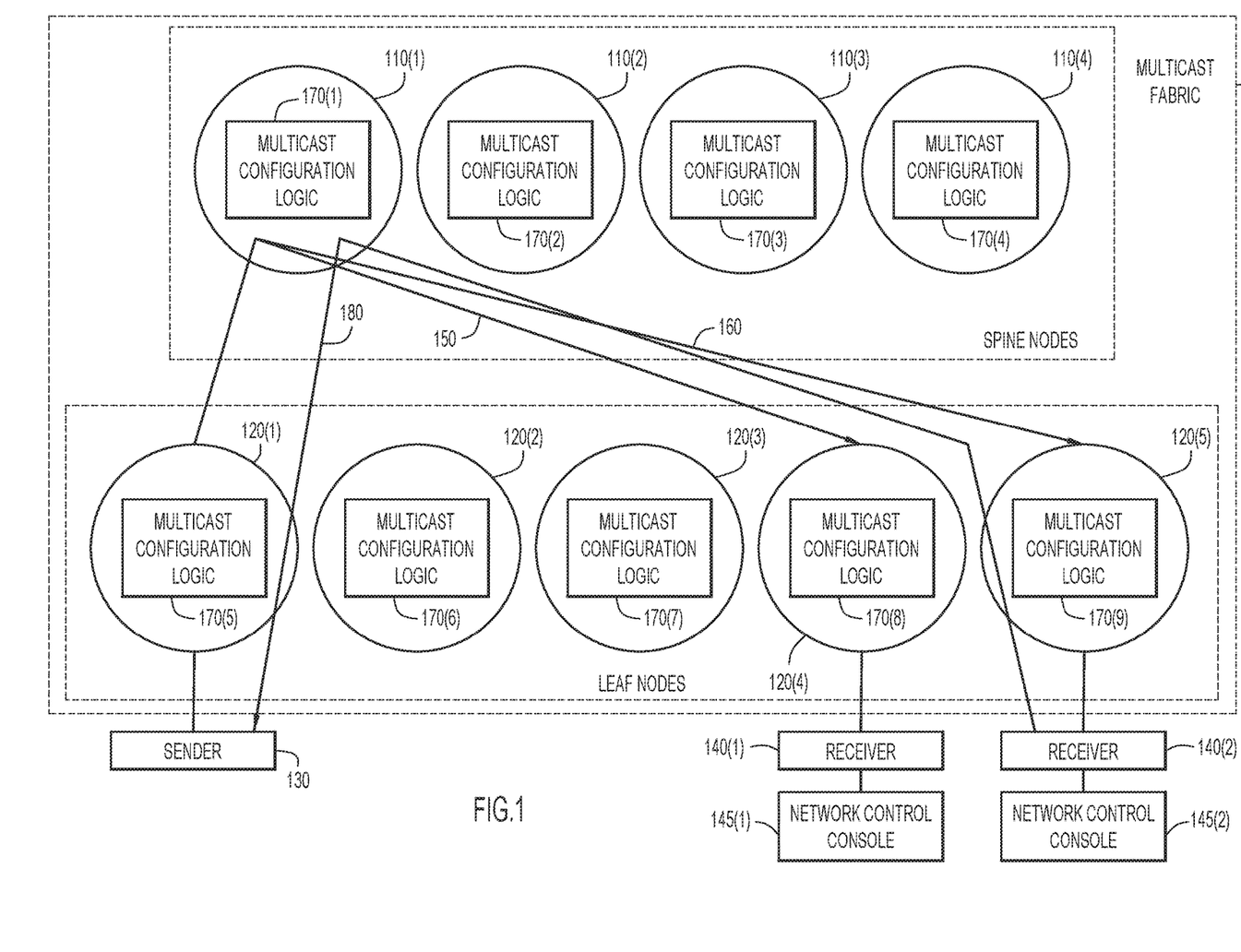
FIG. 1 illustrates a system including a multicast fabric configured for efficient configuration of multicast flows, according to an example embodiment.

With reference made to FIG. 1, shown is a multicast fabric 100 configured for efficient configuration of multicast flows. In one example, the multicast fabric 100 is arranged in a spine-leaf topology including spine nodes 110(1)-110(4) and leaf nodes 120(1)-120(5). One or more spine nodes 110(1)-110(4) are configured to communicate bidirectionally with one or more leaf nodes 120(1)-120(5). As shown, leaf node 120(1) is in communication with sender (source) 130, leaf node 120(4) is in communication with receiver (destination) 140(1), and leaf node 120(5) is in communication with receiver (destination) 140(2). Receivers 140(1) and 140(2) are operable to communicate with network control consoles 145(1) and 145(2), respectively.

Spine nodes 110(1)-110(4) and leaf nodes 120(1)-120(5) may be any suitable network nodes (e.g., switches, routers, etc.). The sender 130 may be any suitable source device of a multicast flow (e.g., server, video camera, microphone, etc.). The receivers 140(1) and 140(2) may be any suitable device configured to receive a multicast stream (e.g., server, display, speaker, mobile user device, etc.). It will be appreciated that the techniques described herein are not necessarily limited to the exact number of spine nodes, leaf nodes, senders, and receivers shown in FIG. 1. For example, other embodiments may involve dozens of spine and/or leaf nodes and thousands of receivers.

Sender 130 sends a multicast flow to receiver 140(1) along multicast path 150, which includes leaf node 120(1), spine node 110(1), and leaf node 120(4). Sender 130 also sends the multicast flow to receiver 140(2) along multicast path 160, which includes leaf node 120(1), spine node 110(1), and leaf node 120(5). More specifically, the sender 130 sends the multicast flow to leaf node 120(1), which in turn sends the multicast flow to spine node 110(1). Spine node 110(1) sends one copy of the multicast flow to leaf node 120(4) and an identical copy of the multicast flow to leaf node 120(5). Leaf nodes 120(4) and 120(5) each send the identical multicast flows to receivers 140(1) and 140(2), respectively. Receivers 140(1) and 140(2) belong to the same multicast group because they obtain identical multicast flows.

Multicast fabrics have traditionally lacked awareness of stream capabilities and characteristics and hence are oblivious to administrative constraints. For example, a network administrator could specify that a multicast flow can only enter a multicast fabric at a certain bandwidth, but could not implement changes to the bandwidth after the multicast flow has entered the network.

One solution is to configure a flow policy table on each network node in the multicast fabric. Briefly, the flow policy table maps multicast groups to a required bandwidth (and other administrative constraints). A network administrator could update the flow policy tables on each network node (e.g., to indicate a new bandwidth for a given multicast group). The network administrator could use a single point of control (e.g., a controller) to distribute the update to every network node in the multicast fabric. However, there are several technical problems associated with this approach because the network nodes can become out of sync with each other.

In particular, since a multicast flow might initially take any multicast path in the multicast fabric depending on bandwidth availability at the time of multicast flow inception, bandwidth awareness is required at every network node in the multicast fabric. Thus, traditionally, every flow policy table in each network node needs to be consistent (e.g., every flow policy table must be updated simultaneously) and specified in advance. However, network nodes can often become out-of-sync, particularly in larger multicast fabrics (e.g., multicast fabrics with hundreds of network nodes).

For example, a network administrator may need to frequently update the flow policy tables on all network nodes in the multicast fabric. This could cause the network nodes to become out-of-sync. The network nodes may become out-of-sync if the network nodes in a multicast path are updated out-of-order (e.g., updating the upstream network nodes before the downstream network nodes, meaning that the downstream network nodes are not prepared to handle the updated bandwidth). The network nodes may also become out-of-sync if the update failed on certain network nodes but was successful on others.

In either case, out-of-sync network nodes can disrupt the multicast flow, thereby resulting in incorrect routing decisions during flow provisioning. Out-of-sync network nodes require unnecessary time and processing to correct the inconsistency with no guarantee of success. Moreover, updating the bandwidth of existing multicast flows dynamically can be tedious and usually requires stopping, clearing, and reinitiating the multicast flow. The network administrator could try to manually isolate the specific network nodes that require updating, but this is not always possible in Protocol Independent Multicast (PIM) Controlled Multi Rendezvous Point (RP) networks.

Accordingly, described herein are techniques to ensure that network nodes remain in-sync during a configuration update of a multicast flow. To that end, spine nodes 110(1)-110(4) and leaf nodes 120(1)-120(5) include multicast configuration logic 170(1)-170(9), respectively. Multicast configuration logic 170(1)-170(9) cause spine nodes 110(1)-110(4) and leaf nodes 120(1)-120(5) to perform operations described herein. In one example, receiver 140(2) may send configuration instructions specifying a configuration of the multicast flow to the sender (source) 130 in a reverse direction of multicast path 160, as represented by the arrow shown at reference numeral 180. Each network node in multicast path 160 receives the configuration instructions, implements the configuration, and sends the configuration instructions upstream toward the sender 130.

Multicast configuration logic 170(1)-170(9) thus resolves the problems associated with out-of-sync network nodes in traditional multicast fabrics. Because each network node in a multicast path is updated sequentially in the upstream direction, the network nodes are updated in the correct order. Moreover, if the configuration update fails at a particular network node in the multicast path (e.g., if the node cannot supply the specified bandwidth), an indication (e.g., a negative acknowledgement) as such may be sent downstream in order to alert the downstream network nodes not to implement the configuration update, and thereby remain in-sync with the other network nodes in the multicast path. Accordingly, multicast configuration logic 170(1)-170(9) causes the network nodes in a multicast path to remain in-sync and ultimately improve the functioning of multicast flows in a multicast fabric.

In one example, a network administrator provides, to receiver 140(2), configuration instructions specifying a configuration (e.g., bandwidth) of the multicast flow. The network administrator may provide the configuration instructions via network control console 145(2) using a Representational State Transfer (REST) Application Programming Interface (API) or Command Line Interface (CLI). In one specific example, the network administrator may use Cisco Systems, Inc.'s Data Management Engine (DME) for API exchange through REST calls. A DME model change may enable the network administrator to use a REST API with Cisco Systems, Inc. network devices.

Leaf node 120(5) obtains the configuration instructions from receiver 140(2) in the reverse direction of multicast path 160, as shown at reference numeral 180, and implements the configuration of the multicast flow in accordance with the configuration instructions (e.g., changing the bandwidth settings on leaf node 120(5)). Leaf node 120(5) provides the configuration instructions toward the sender 130 in reverse direction of the multicast path 160 (i.e., to spine node 110(1)).

Spine node 110(1) obtains the configuration instructions from receiver 140(2) (i.e., via leaf node 120(5)) in the reverse direction of multicast path 160 and implements the configuration of the multicast flow in accordance with the configuration instructions. Spine node 110(1) provides the configuration instructions toward the sender 130 in reverse direction of the multicast path 160 (i.e., to leaf node 120(1)). Leaf node 120(1) obtains the configuration instructions from receiver 140(2) (i.e., via spine node 110(1)) in the reverse direction of multicast path 160 and implements the configuration of the multicast flow in accordance with the configuration instructions. Leaf node 120(1) provides the configuration instructions toward the sender 130 in reverse direction of the multicast path 160 (i.e., to sender 130).

By the time the sender 130 receives and implements the configuration instructions, each network node in the multicast path 160 has already been updated accordingly. Each network node in the multicast path 160 is therefore in-sync and prepared for the updated multicast stream provided by sender 130. In this example, spine node 110(1) may drop the multicast flow to leaf node 120(4) and receiver 140(1) when implementing the configuration update, because there is now a mismatch between the configuration of spine node 110(1) and that of leaf node 120(4). Leaf node 120(4) may then send a join request with the new configuration to spine node 110(1), which may reinstate multicast path 150 with the new configuration. Thus, in contrast with a traditional multicast fabric that would require an update of every network node, only the network nodes in multicast paths 150 and 160 are updated. Multicast configuration logic 170(1)-170(9) also relieves burden on the network administrator(s), who now only has to update receiver 140(2) instead of ensuring every network node in the multicast fabric 100 has been updated and is in-sync.

Initially, the multicast fabric 100 may deny all hosts (i.e., sender 130 and receivers 140(1) and 140(2)) from sending or receiving multicast flows. In this state, there are no multicast flows in multicast fabric 100. A receiver (e.g., receiver 140(2)) may establish a multicast flow by sending an Internet Group Management Protocol (IGMP) join packet or an API call to leaf node 120(5). In one example, receiver 140(2) may establish the multicast flow by sending the IGMP join packet to sender 130 (e.g., in the reverse direction of multicast path 160). The IGMP join packet may specify sender 130 as the multicast source, and may further specify a desired multicast group. The IGMP join packet may also specify configuration instructions (e.g., bandwidth) using a flexible field in the IGMP join packet. Leaf node 120(5) may dynamically discover an interface of receiver 140(2) for receiving the multicast flow when the IGMP join packet is obtained from receiver 140(2).

In another example, receiver 140(2) may establish the multicast flow using an API call. The API call may include the Internet Protocol (IP) address of the receiver 140(2), the desired multicast group, and the IP address of the sender 130 for the desired multicast group. The IP address of the sender 130 is optional and may help simulate a (*,G) IGMP join packet, where * represents multicast source(s) and G represents the desired multicast group. The API may optionally specify an interface of receiver 140(2) to receive the multicast flow.

The IGMP join packet or API call may further include configuration information specifying any suitable configuration of the multicast flow. Examples of configurations of multicast flow include bandwidth, Differentiated Services Code Point (DSCP) marking, priority, and essence. The bandwidth may be a maximum bandwidth required for a given stream. If the bandwidth is not specified, a predetermined multicast group bandwidth or predefined default bandwidth may be used. DSCP may classify network traffic as a given type (e.g., multicast fabric 100 may perform certain routing operations depending on the type of traffic as indicated by DSCP). Priority may cause network nodes to prioritize certain multicast flows over others. For instance, a lower priority flow may be dropped to accommodate a higher priority flow if necessary. In one example, a small priority value may indicate that the multicast flow has a high priority.

Essence refers to a "bundle" of associated multicast flows. In other words, essence permits one or more receivers to specify that certain multicast flows are logically grouped together. In one example, multicast fabric 100 may send multicast flows along the same multicast path in the multicast fabric 100. In another example, multicast fabric 100 may either provision all multicast flows of a given essence, or no multicast flows of that essence (e.g., based on resource (such as bandwidth) availability). For instance, a single source may send separate (e.g., 16 or 18) multicast flows for video/audio streams. In one specific example, the essence may be assigned according to Video Services Forum Technical Recommendation 03 (VSF TR-03).

Leaf node 120(5) obtains the IGMP join packet or API call from receiver 140(2) and determines whether there is already an existing policy on leaf node 120(5) for that multicast flow. In this case, since there is no preexisting policy, leaf node 120(5) creates a new entry in its local flow policy table and applies a permit policy to the IP address of the receiver 140(2). The permit policy allows the receiver 140(2) to receive multicast flows in the multicast fabric 100. Leaf node 120(5) uses the policy information to calculate a possible multicast path and optionally applies a policer on the ingress interface of the receiver 140(2).

The configuration information may be propagated to sender 130 as described above (as represented by 180). When the first hop network node (here, leaf node 120(1)) obtains the multicast flow request (and configuration information), leaf node 120(1) applies a permit policy for sender 130. The permit policy allows the receiver 140(2) to send multicast flows in the multicast fabric 100. The leaf node 120(1) optionally applies a policer to the egress interface on sender 130 to limit the multicast flow in accordance with the desired configurations (e.g., bandwidth). The sender 130 may then provide the multicast flow to receiver 140(2) at the desired configurations along multicast path 160.

In a further example, the leaf node 120(5) may determine that the receiver 140(2) established a previously unspecified configuration of the multicast flow and, in response, identify receiver 140(2) as a master receiver of the multicast flow. Here, the receiver 140(2) established a previously unspecified configuration of the multicast flow because the receiver 140(2) established (first requested) the multicast flow. Receiver 140(2) is therefore designated as a master receiver of the multicast flow, meaning that receiver 140(2) has a higher privilege to update the configuration of the multicast flow over other receivers of that multicast flow (e.g., receiver 140(1)).

Receiver 140(1) may subsequently request to join the multicast flow by providing an IGMP join packet or API call to leaf node 120(4). A network administrator may cause the receiver 140(1) to send the join request via network control console 145(1). In this example, there is no conflict between the existing configuration and the configuration information in the join request from receiver 140(1). Accordingly, even though receiver 140(1) is not the master receiver, leaf node 120(4) may create a new entry in its local flow policy table and provide the join request to spine node 110(1). Spine node 110(1) may then begin sending a copy of the multicast flow to receiver 140(1) via leaf node 120(4), thereby creating multicast path 150.

Receiver 140(2) may send a configuration update (e.g., via an API call) to leaf node 120(5). A network administrator may cause the receiver 140(2) to send the configuration update via network control console 145(2). Leaf node 120 (5) may determine that the existing configuration and the configuration update is different and, as such, check whether the receiver 140(2) is the master receiver (e.g., whether the API is called for the same receiver IP address and multicast group as is stored in the existing entry of the local flow policy table of leaf node 120(5)). In this case, receiver 140(2) is the master receiver, and therefore the configuration updates are implemented. In particular, the configuration updates are propagated in the reverse direction of multicast path 160, as represented by 180.

Receiver 140(1) may also send a configuration update (e.g., via an API call) to leaf node 120(4). A network administrator may cause the receiver 140(1) to send the configuration update via network control console 145(1). Leaf node 120(4) may determine that the existing configuration and the configuration update is different and, as such, check whether the receiver 140(1) is the master receiver. In this case, receiver 140(1) is not the master receiver, and is therefore by default unable to make configuration updates. Accordingly, leaf node 120(4) may deny the desired configuration updates.

However, an override flag option may be provided to enable receiver 140(1) to update the configuration despite not being the master receiver for the multicast flow. Receiver 140(1) may include an override flag in the configuration update (e.g., API call) before sending the configuration update to leaf node 120(4). Upon determining that receiver 140(1) is not the master receiver, leaf node 120(4) may determine whether the override flag is present. If leaf node 120(4) verifies that the override flag is present, the configuration updates may be propagated in the reverse direction of multicast path 150. The override flag may be required only when changing an existing configuration policy.

Multicast configuration logic 170(1)-170(9) may be identical or similar, or may vary depending on the particular network node on which the multicast configuration logic 170(1)-170(9) is implemented. For example, multicast configuration logic 170(1)-170(4) may cause spine nodes 110 (1)-110(4) to obtain and provide configuration instructions between leaf nodes 120(1)-120(5). Multicast configuration logic 170(5)-170(9) may cause leaf nodes 120(1)-120(5) to obtain configuration instructions from receivers (e.g., receivers 140(1) and 140(2)) and/or to provide configuration instructions to one or more senders (e.g., sender 130).

Figure 2:
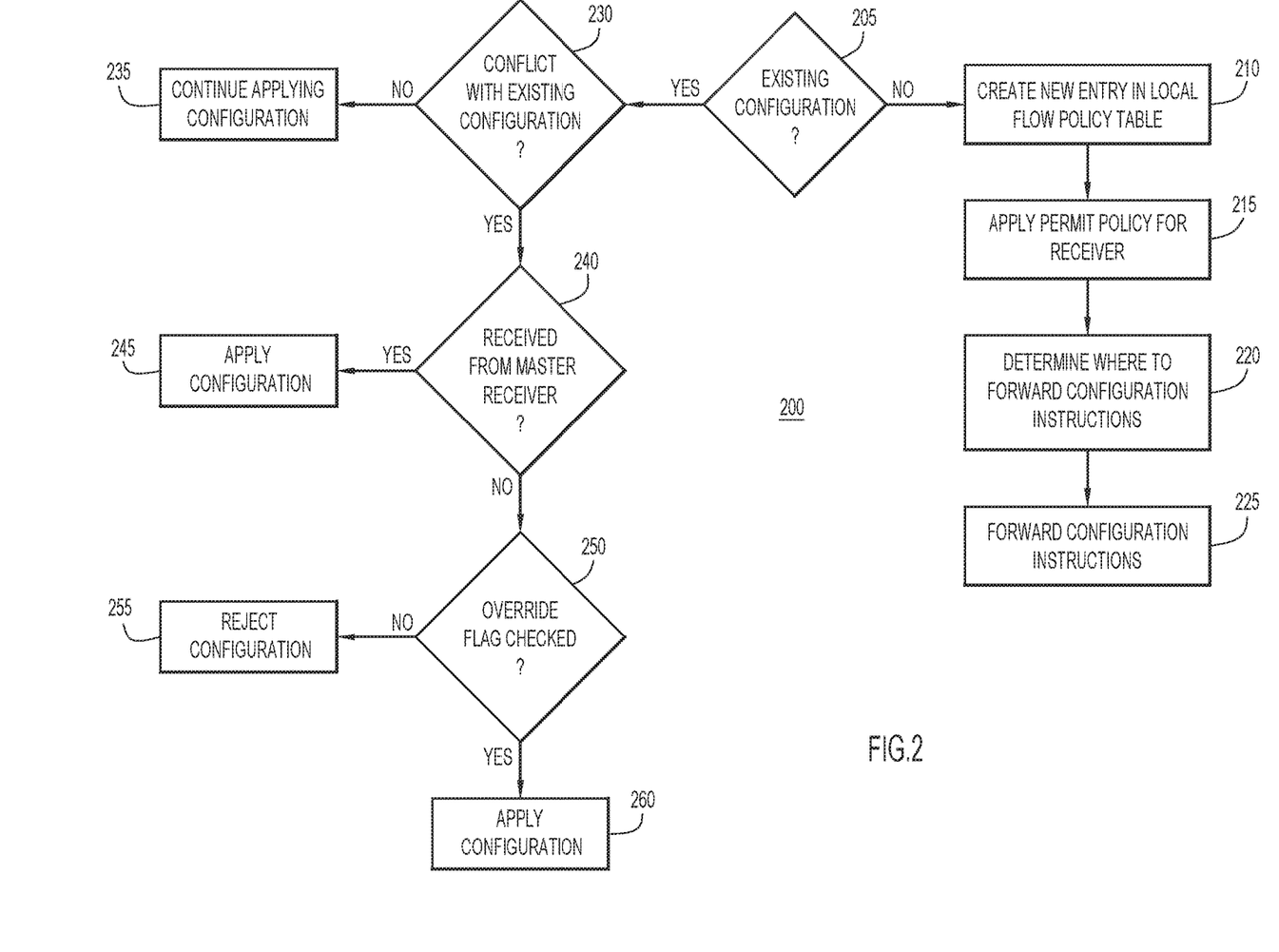
FIG. 2 is a flowchart of a method for handling received configuration instructions, according to an example embodiment.

FIG. 2 is a flowchart of a method 200 for handling received configuration instructions. Method 200 may be performed by a network node in a multicast fabric (e.g., leaf node 120(5) shown in FIG. 1) upon receiving configuration information for a given multicast flow from a receiver (e.g., receiver 140(2) shown in FIG. 1). At 205, the network node determines whether there is already an existing configuration in the local flow policy table. If there is not, at 210 the network node creates a new entry in its local flow policy table for the multicast flow with the configuration information. At 215, the network node applies a permit policy for the receiver. At 220, the network node determines where (e.g., to which spine node in the multicast fabric) to forward the configuration instructions and, at 225, forwards the configuration instructions to the appropriate destination.

If the network node determines at 205 that there is an existing configuration, at 230 the network node determines whether the configuration instructions conflict with the existing configuration. If there is no conflict with the existing configuration, at 235 the network node continues applying the existing configuration. This may occur, for example, when a new receiver is requesting to join an existing multicast group with the existing configuration. If there is a conflict with the existing configuration, at 240 the network node determines whether the configuration instructions were received from the master receiver. If the configuration instructions were received from the master receiver, at 245 the new configuration is applied. If the configuration instructions were not received from the master receiver, at 250 the network node determines whether the override flag is checked. If it is determined that the override flag is not checked, at 255 the network node rejects the new configuration. At 260, if it is determined that the override flag is checked, the network node applies the new configuration.

Figure 3:
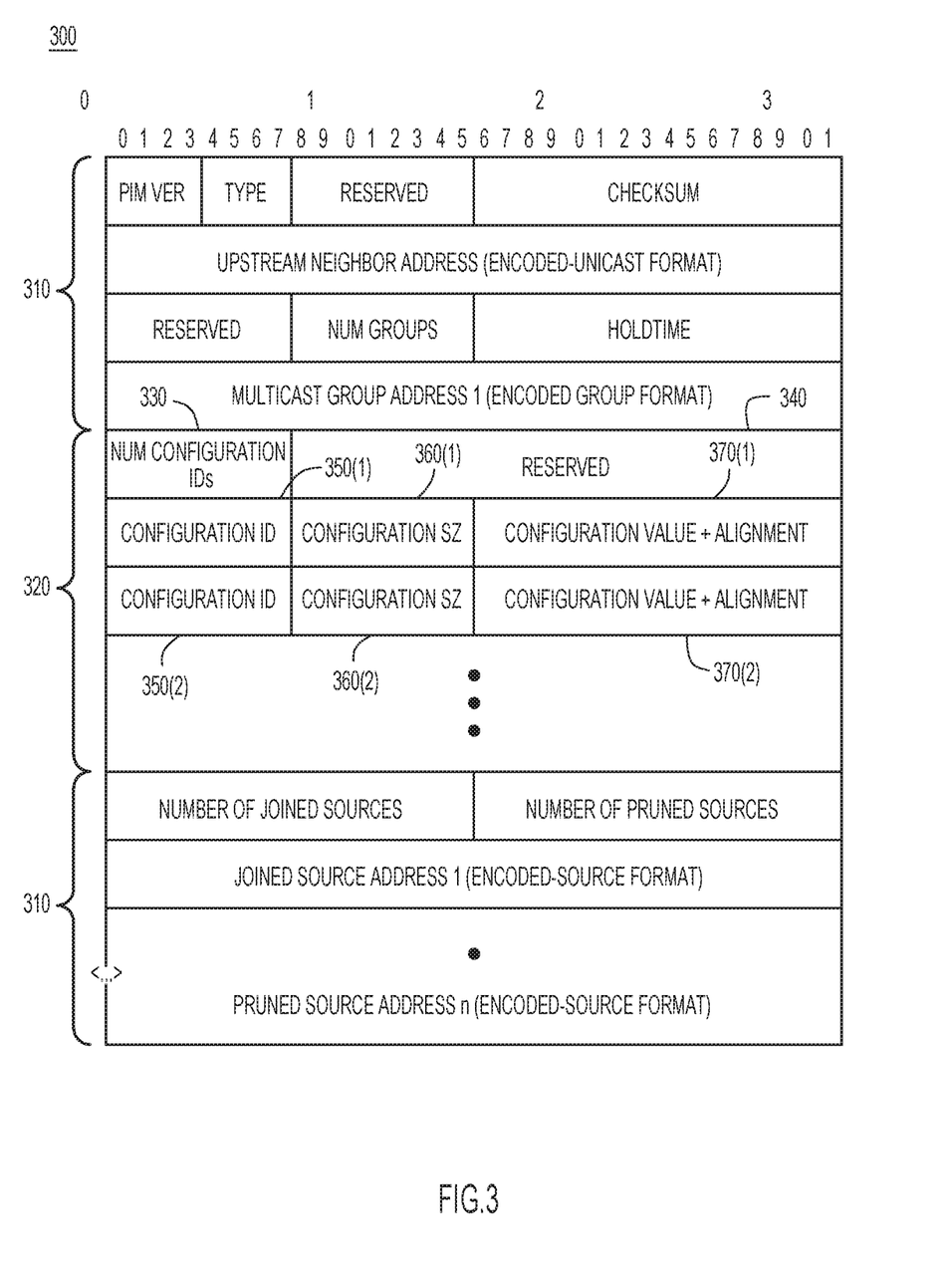
FIG. 3 illustrates a Protocol Independent Multicast (PIM) packet including configuration instructions, according to an example embodiment.

FIG. 3 illustrates a modified PIM join packet 300 including configuration instructions. Modified PIM join packet 300 includes standard fields 310 (labeled accordingly in FIG. 3) and configuration fields 320. Configuration fields 320 include fields 330, 340, 350(1), 350(2), 360(1), 360(2), 370(1), and 370(2). Field 330 indicates a number of configuration identifiers (IDs) identified in the modified PIM join packet 300, and field 340 is reserved. Field 350(1) indicates a first configuration ID, field 360(1) indicates a first configuration size, and field 370(1) indicates a first configuration value and alignment. Field 350(2) indicates a second configuration identifier (ID), field 360(2) indicates a second configuration size, and field 370(2) indicates a second configuration value and alignment. In some examples, the override flag may be included as a capability in the modified PIM join packet 300. It will be appreciated that modified PIM join packet 300 may specify any suitable number of capabilities.

For example, field 350(1) may indicate a configuration ID of 00000001, field 360(1) may indicate a configuration size of 2, and field 370(1) may indicate a configuration value and alignment of 2500. In this example, a configuration ID of 00000001 may correspond to a bandwidth measured in kilobytes per second (KBPS), so modified PIM join packet 300 specifies a configuration of 2500 KBPS. Other configuration IDs may correspond to other units (e.g., a configuration ID of 00000002 may correspond to a bandwidth measured in megabytes per second (MBPS), a configuration ID of 00000003 may correspond to a bandwidth measured in gigabytes per second (GBPS), etc.).

Field 350(2) may indicate a configuration ID of 0000000A, field 360(2) may indicate a configuration size of 1, and field 370(2) may indicate a configuration value and alignment of 5. In this example, a configuration ID of 0000000A may correspond to a DSCP value, so modified PIM join packet 300 further specifies a DSCP value of 5. In a case where a device receiving the modified PIM join packet 300 encounters an unknown configuration ID, that device may ignore the unknown configuration ID by skipping bytes learnt from the size field.

Network nodes in the multicast fabric 100 may communicate with each other using modified PIM join packet 300, which carries a payload of flexible size including configuration information. For example, after receiving configuration information from receiver 140(2) via an IGMP join packet or API call, leaf node 120(5) may send the configuration information to spine node 110(1) using modified PIM join packet 300. Spine node 110(1) may, in turn, send the configuration information to leaf node 120(1) using modified PIM join packet 300. Sender 130 may thus obtain the configuration information from the leaf node 120(1). It will be appreciated that the network nodes in multicast fabric 100 may communicate with each other in any suitable manner (e.g., other than PIM), such as by using proprietary control messages between switches, or by enhancing existing control protocols that are already available in the multicast fabric 100. In one example, join attributes may be used.

However, enhancing PIM with modified PIM join packet 300 may be advantageous in certain scenarios. For example, including the configuration information in the PIM configuration packet eliminates the need for a separate configuration packet to convey configuration information. This may be advantageous because a separate configuration packet would introduce implicit delay to multicast fabric 100 due to the time necessary for the capabilities packet to propagate through the multicast fabric 100. Also, there is no mechanism to provide an alert that a separate configuration packet has not successfully propagated through the multicast fabric. PIM has a built-in negative acknowledgment mechanism that allows a network node (e.g., spine node 110(1)) to communicate to another network node (e.g., leaf node 120(5)) or the receiver (e.g., receiver 140(2)) that the network node cannot implement a specified configuration (e.g., bandwidth). This allows the other network node or the receiver to send a new request to a different network node. Moreover, there is no need to consider backward compatibility to enhance PIM because the enhancement occurs within the multicast fabric 100.

Failure to provision a flow, as well as conflicting configuration requirements, may be handled through flow rejection internally in the fabric via PIM Equal-Cost Multi-Path (ECMP) redirect messages. The PIM ECMP redirect message may be sent downstream to indicate failure from the junction where the configuration mismatch is found. For example, if a spine node determines that there is a mismatch between the proposed configuration and the existing configuration, the spine node may reject the modified PIM join packet 300 with a PIM ECMP redirect message. This ensures that even if the receivers in the fabric have mismatched configurations, this does not cause any flooding and does not impact any existing flows. API failure may be implementation specific, and may be handled by returning a failure indication to the REST API call, or via Syslog, Simple Network Management Protocol (SNMP) traps, websockets, etc.

Figure 4:
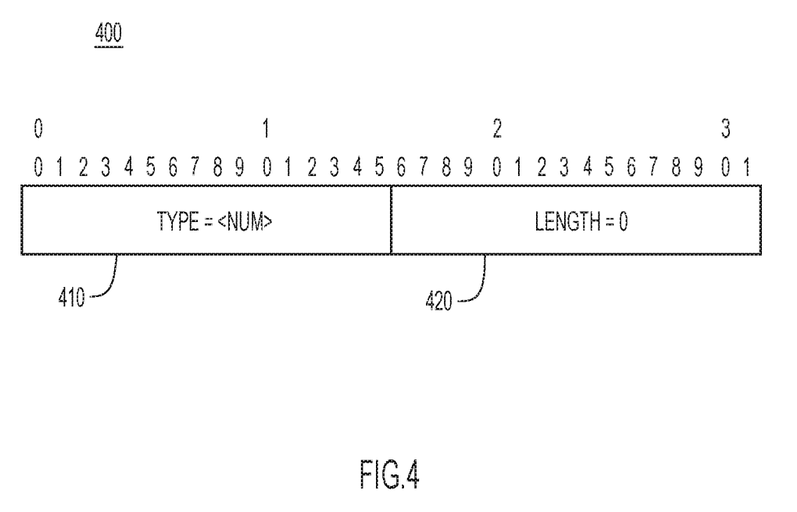
FIG. 4 illustrates a PIM hello packet indicating that a network node supports a PIM packet including configuration instructions, according to an example embodiment.

FIG. 4 illustrates a PIM hello packet 400 indicating that a network node in multicast fabric 100 supports modified PIM join packet 300. PIM hello packet 400 includes type field 410 and length field 420. The value for type field 410 may be any suitable value (e.g., 37). Length field 420 indicates that the length of the PIM join packet 300 is zero. In some examples, upon initialization of the multicast fabric 100 (e.g., while all hosts are denied), the network nodes in multicast fabric 100 may send PIM hello packet 400 to their neighboring network nodes. In one example, a network node only sends configuration information on an interface when that network node has received the PIM hello packet 400 from all neighboring network nodes on that interface. The network node may not send modified PIM join packet 300 to any neighboring network nodes that that do not support modified PIM join packet 300, but may nonetheless process any configuration information that network node receives from any of its neighboring network nodes.

If a network node does not support modified PIM join packet 300, that network node may ignore any modified PIM join packet 300 and/or PIM hello packet 400 that the network node receives. A network administrator may individually configure the network nodes that do not support modified PIM join packet 300. For example, the network administrator may configure those network nodes to have a configuration that matches the new configuration. In another example, network nodes and/or hosts that cannot advertise the required configuration may be isolated from those that can.

Figure 5:
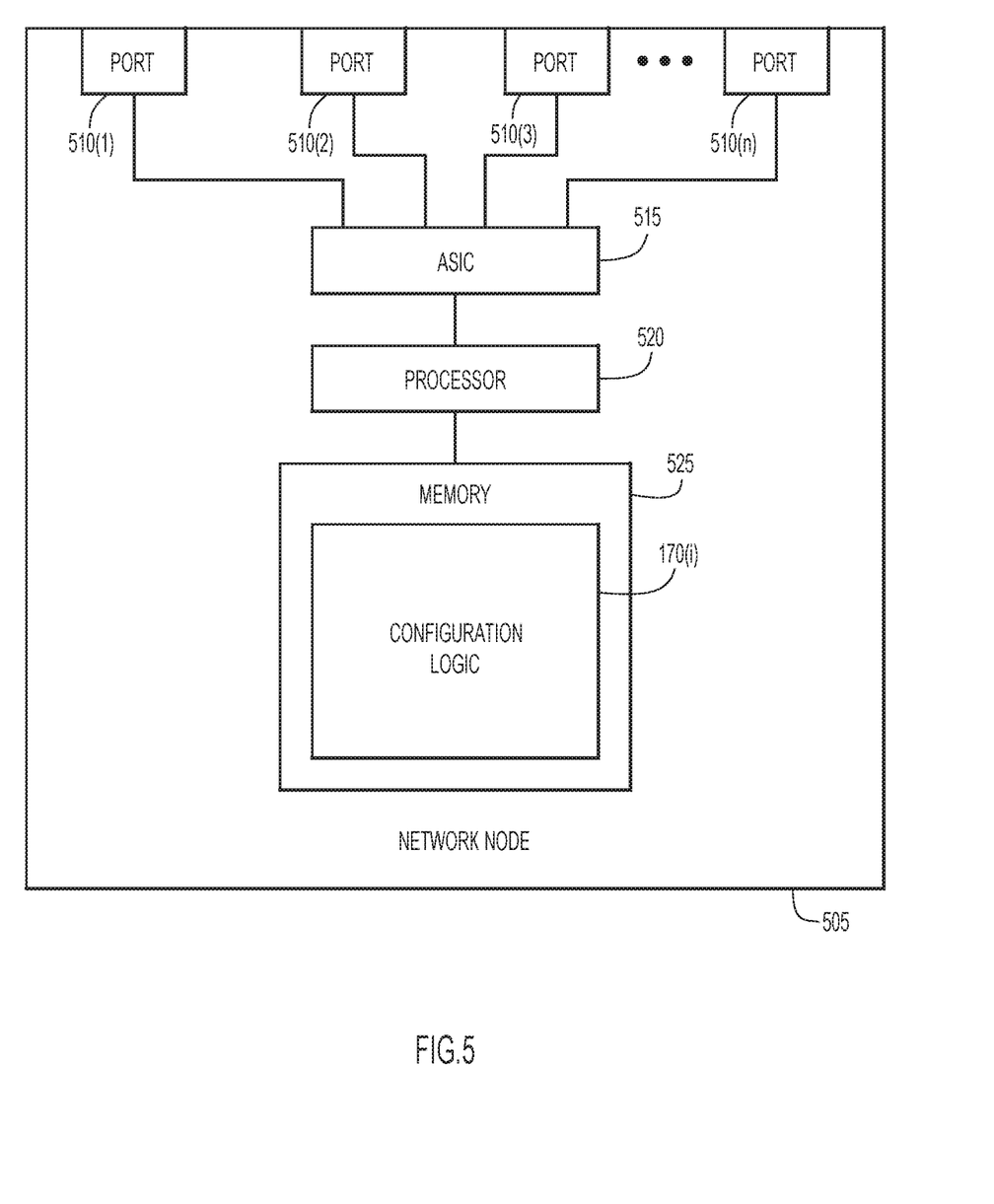
FIG. 5 is a block diagram of a network node configured to efficiently configure multicast flows, according to an example embodiment.

FIG. 5 is a block diagram of a network node 505 that is configured to implement techniques presented herein. The network node 505 includes a network interface in the form of a plurality of network ports 510(1)-510(n) that enable communications over a network, an Application Specific Integrated Circuit (ASIC) 515 that performs network processing functions, one or more processors 520 (e.g., microprocessors or microcontrollers), and a memory 525. The memory 525 stores executable instructions for multicast configuration logic 170(i). Alternatively, some or all of the operations of the multicast configuration logic 170(i) may be implemented by the ASIC 515.

The memory 525 may include read only memory (ROM), random access memory (RAM), magnetic disk storage media devices, optical storage media devices, flash memory devices, electrical, optical, or other physical/tangible memory storage devices. Thus, in general, the memory 525 may comprise one or more tangible (non-transitory) computer readable storage media (e.g., a memory device) encoded with software comprising computer executable instructions and when the software is executed (e.g., by the one or more processors 520) it is operable to perform operations described herein. In particular, as noted, the memory 525 includes multicast configuration logic 170(i) that, when executed, enables the network node 505 to perform operations described herein.

Figure 6:
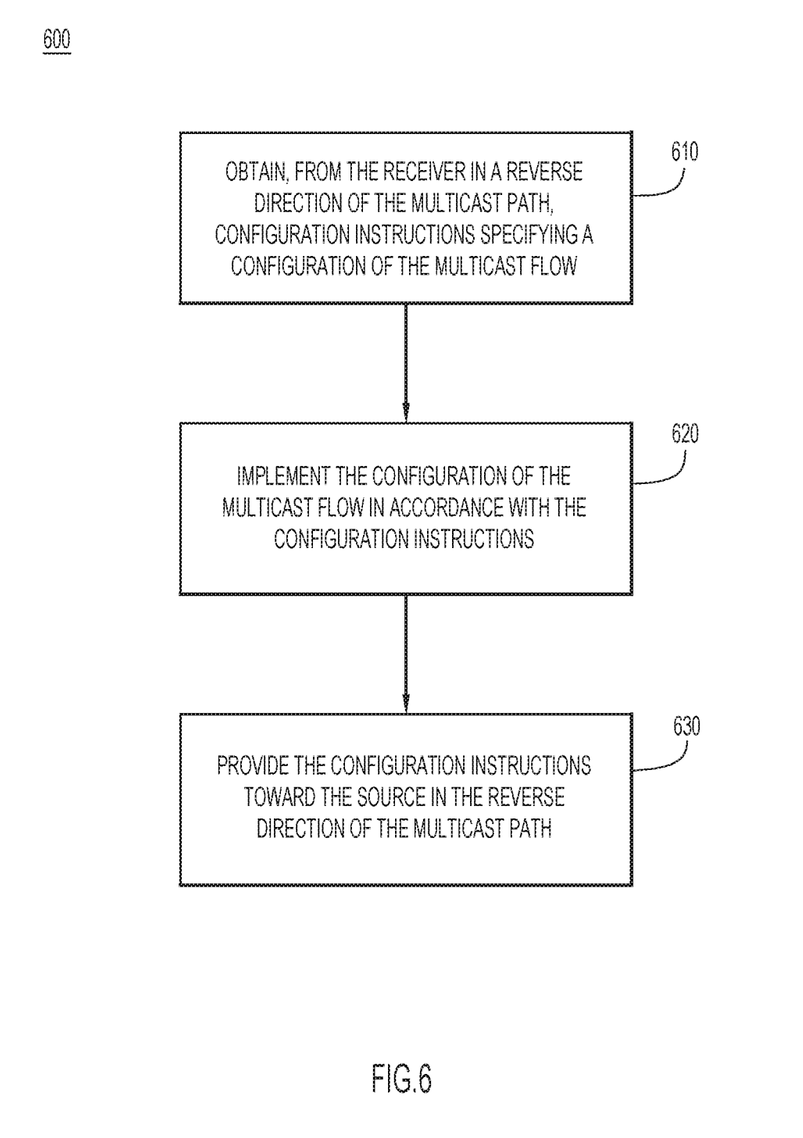
FIG. 6 is a flowchart of a method for efficient configuration of multicast flows, according to an example embodiment.

FIG. 6 is a flowchart of a method 600 for efficient configuration of multicast flows. Method 600 may be performed at a network node of a plurality of network nodes in a multicast path configured to provide a multicast flow from a source of the multicast flow to a receiver of the multicast flow (e.g., any of spine nodes 110(1)-110(4) and leaf nodes 120(1)-120(5)). At 610, the network node obtains (e.g., receives), from the receiver in a reverse direction of the multicast path, configuration instructions specifying a configuration of the multicast flow. At 620, the network node implements the configuration of the multicast flow in accordance with the configuration instructions. At 630, the network node provides (e.g., sends) the configuration instructions toward the source in the reverse direction of the multicast path.

The multicast flows may be bound to flexible configurations/capabilities. A network administrator may configure a multicast fabric with configuration instructions by percolating the instructions within the network transparently, without impacting any existing provisioning. This may support many helpful use cases. For example, if a spine node can no longer provide a multicast flow to a receiver, the receiver may be alerted as such and send a configuration update to a different spine node to establish a multicast connection with the sender. If two senders provide multicast flows belonging to a single multicast group to a receiver, the receiver may automatically update both senders and their respective multicast paths. A new receiver may join the multicast fabric and request a multicast flow from one of the senders. In the event that a configuration is being modified on existing flows, the configuration change may be communicated upstream by a network node after making local changes to accommodate the change, and hence there may be a policer in place protecting existing flows.

Moreover, these techniques may complement Advanced Media Workflow Association (AMWA) Networked Media Open Specification (NMOS) IS-06. AMWA NMOS IS-06 defines APIs for an endpoint to be able to request a static join with embedded bandwidth information. The techniques described herein may percolate that information surgically through the fabric, making the process seamless and transparent to the receiver and network administrator(s).

In one form, a method is provided. The method comprises: at a network node of a plurality of network nodes in a multicast path configured to provide a multicast flow from a source of the multicast flow to a receiver of the multicast flow: obtaining (receiving), from the receiver in a reverse direction of the multicast path, configuration instructions specifying a configuration of the multicast flow; implementing the configuration of the multicast flow in accordance with the configuration instructions; and providing (sending) the configuration instructions toward the source in the reverse direction of the multicast path.

In another form, an apparatus is provided. The apparatus comprises: a network interface configured to provide/obtain (send/receive) messages to/from one or more of a plurality of network nodes in a multicast path configured to provide a multicast flow from a source of the multicast flow to a receiver of the multicast flow; and one or more processors coupled to the network interface, wherein the one or more processors are configured to: obtain (receive), from the receiver in a reverse direction of the multicast path, configuration instructions specifying a configuration of the multicast flow; implement the configuration of the multicast flow in accordance with the configuration instructions; and provide (send) the configuration instructions toward the source in the reverse direction of the multicast path.

In another form, one or more non-transitory computer readable storage media are provided. The non-transitory computer readable storage media are encoded with processing instructions that, when executed by a processor of a network node of a plurality of network nodes in a multicast path configured to provide a multicast flow from a source of the multicast flow to a receiver of the multicast flow, cause the processor to: obtain (receive), from the receiver in a reverse direction of the multicast path, configuration instructions specifying a configuration of the multicast flow; implement the configuration of the multicast flow in accordance with the configuration instructions; and provide (send) the configuration instructions toward the source in the reverse direction of the multicast path.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
at a network node of a plurality of network nodes in a multicast path configured to provide a multicast flow from a source of the multicast flow to a receiver of the multicast flow:

obtaining, from the receiver in a reverse direction of the multicast path, configuration instructions specifying a configuration of the multicast flow;

implementing the configuration of the multicast flow in accordance with the configuration instructions; and providing the configuration instructions toward the source in the reverse direction of the multicast path.

2. The method of claim 1, wherein the configuration instructions specify a change to an existing configuration of the multicast flow, the method further comprising:

at the network node:

determining that the receiver is not a master receiver of the multicast flow; and in response to determining that the receiver is not the master receiver of the multicast flow, verifying that an override flag associated with the configuration instructions is present, wherein implementing the configuration of the multicast flow includes implementing the change to the existing configuration of the multicast flow in response to the override flag being present.

3. The method of claim 2, wherein determining that the receiver is not the master receiver of the multicast flow includes determining that the receiver did not establish the existing configuration of the multicast flow.

4. The method of claim 1, wherein the configuration instructions specify a previously unspecified configuration of the multicast flow.

5. The method of claim 4, further comprising:

at the network node:

determining that the receiver established the previously unspecified configuration of the multicast flow; and in response to determining that the receiver established the previously unspecified configuration of the multicast flow, identifying the receiver as a master receiver of the multicast flow.

6. The method of claim 1, wherein providing the configuration instructions includes providing a Protocol Independent Multicast packet including the configuration instructions to another network node of the plurality of network nodes.

7. The method of claim 6, further comprising:

at the network node:

before providing the Protocol Independent Multicast packet including the configuration instructions to the other network node, obtaining, from the other network node, a Protocol Independent Multicast hello packet indicating that the other network node supports the Protocol Independent Multicast packet including the configuration instructions.

8. The method of claim 1, wherein obtaining the configuration instructions includes obtaining an Internet Group Management Protocol packet from the receiver.

9. The method of claim 1, wherein obtaining the configuration instructions obtaining an Application Programming Interface call from the receiver.

10. The method of claim 1, wherein obtaining the configuration instructions includes obtaining the configuration instructions from the receiver via another network node in the multicast path.

11. The method of claim 1, wherein the configuration instructions specify a bandwidth of the multicast flow.

12. An apparatus comprising:

a network interface configured to provide/obtain network communications to/from one or more of a plurality of network nodes in a multicast path configured to provide a multicast flow from a source of the multicast flow to a receiver of the multicast flow; and one or more processors coupled to the network interface, wherein the one or more processors are configured to:

obtain, from the receiver in a reverse direction of the multicast path, configuration instructions specifying a configuration of the multicast flow;

implement the configuration of the multicast flow in accordance with the configuration instructions; and provide the configuration instructions toward the source in the reverse direction of the multicast path.

13. The apparatus of claim 12, wherein the configuration instructions specify a change to an existing configuration of the multicast flow, and wherein the one or more processors are further configured to:

determine that the receiver is not a master receiver of the multicast flow;

in response to determining that the receiver is not the master receiver of the multicast flow, verify that an override flag associated with the configuration instructions is present; and implement the change to the existing configuration of the multicast flow in response to the override flag being present.

14. The apparatus of claim 12, wherein the configuration instructions specify a previously unspecified configuration of the multicast flow.

15. The apparatus of claim 12, wherein the one or more processors are configured to provide a Protocol Independent Multicast packet including the configuration instructions to another network node of the plurality of network nodes.

16. The apparatus of claim 12, wherein the configuration instructions specify a bandwidth of the multicast flow.

17. One or more non-transitory computer readable storage media encoded with processing instructions that, when executed by a processor of a network node of a plurality of network nodes in a multicast path configured to provide a multicast flow from a source of the multicast flow to a receiver of the multicast flow, cause the processor to:

obtain, from the receiver in a reverse direction of the multicast path, configuration instructions specifying a configuration of the multicast flow;

implement the configuration of the multicast flow in accordance with the configuration instructions; and provide the configuration instructions toward the source in the reverse direction of the multicast path.

18. The non-transitory computer readable storage media of claim 17, wherein the configuration instructions specify a change to an existing configuration of the multicast flow, and wherein the processing instructions further cause the processor to:

determine that the receiver is not a master receiver of the multicast flow;

in response to determining that the receiver is not the master receiver of the multicast flow, verify that an override flag associated with the configuration instructions is present; and implement the change to the existing configuration of the multicast flow in response to the override flag being present.

19. The non-transitory computer readable storage media of claim 17, wherein the configuration instructions specify a previously unspecified configuration of the multicast flow.

20. The non-transitory computer readable storage media of claim 17, wherein the processing instructions further cause the processor to provide a Protocol Independent Multicast packet including the configuration instructions to another network node of the plurality of network nodes.

\* \* \* \* \*